United States Patent
Enrietto et al.

(10) Patent No.: US 6,538,426 B1
(45) Date of Patent: Mar. 25, 2003

(54) COMBINED HUB TEMPERATURE AND WHEEL SPEED SENSOR SYSTEM

(75) Inventors: John Enrietto, Ft. Wayne, IN (US); Keith Folsom, Ft. Wayne, IN (US); Bruce Tomlinson, Largo, IN (US)

(73) Assignee: Wabash Technologies, Inc., Huntington, IN (US)

( * ) Notice: Subject to any disclaimer, the term of this patent is extended or adjusted under 35 U.S.C. 154(b) by 0 days.

(21) Appl. No.: 09/650,557

(22) Filed: Aug. 30, 2000

(51) Int. Cl.[7] ............................. G01P 3/487; G01K 7/00
(52) U.S. Cl. .................. 324/174; 324/207.12; 324/165; 384/448; 374/183
(58) Field of Search ........................... 324/174, 207.12, 324/165, 166, 173, 207.15, 207.17, 207.2, 207.21, 207.25, 225; 384/448; 310/68 B, 68 C; 374/183, 184

(56) References Cited

U.S. PATENT DOCUMENTS

| 5,231,391 A | 7/1993 | Rigaux ........................ 340/448 |
| 5,381,090 A | 1/1995 | Adler et al. ................. 324/174 |
| 5,880,585 A | 3/1999 | Oguro ......................... 324/174 |
| 6,087,796 A | 7/2000 | Canada et al. .............. 318/565 |

*Primary Examiner*—Jay Patidar
(74) *Attorney, Agent, or Firm*—Woodard, Emhardt, Naughton, Moriarty & McNett LLP

(57) ABSTRACT

A combined hub temperature and wheel speed sensor system comprises a sensor assembly coupled to an axle and a wheel assembly fixedly coupled to the wheel, which in turn is free to rotate with respect to the axle. The wheel assembly includes a ring magnet. The sensor assembly includes a temperature sensor in proximity to the wheel bearing, Hall effect sensors positioned to detect the rotation of the ring magnet, and a circuit for generating and transmitting signals corresponding to the wheel rotation speed, rotation direction, and bearing temperature.

5 Claims, 5 Drawing Sheets

COMBINED HUB TEMPERATURE AND WHEEL SPEED SENSOR SYSTEM

The present invention generally relates to automotive sensors, and more particularly to a system for the combined detection of hub temperature and wheel speed.

BACKGROUND OF THE INVENTION

Wheel speed sensors are used in motor vehicles in a number of applications, including control of anti-lock brake system or traction-control systems. Such wheel speed sensors preferably make a non-contact observation of the rotation of the wheel, both to avoid interference with the wheel's movement and to avoid the difficulty of transmitting a signal from the rotating wheel to the vehicle. Wheel speed sensors making such a non-contact observation typically couple to the wheel a rotor having a magnetic element. The magnetic element typically creates a magnetic field with alternating magnetic flux lines at some radial position relative to the wheel's axis of rotation. A circuit containing a magnetic field sensor, such as a Hall effect sensor, is typically located at that position but separately from the rotor assembly, and not coupled to the wheel. The magnetic field sensor detects the alternating magnetic flux as the wheel rotates and causes the circuit to produce a signal responsive to the rate of alternation in the flux lines, and therefore proportional to the angular speed of the wheel.

For certain applications, additional formation is useful for monitoring the performance of the wheels of a vehicle. One piece of additional information that may be valuable is the direction of the wheel's rotation. It may therefore be preferable in some applications to generate a signal indicating the wheel's angular velocity (that is, both its angular speed and direction of rotation), rather than just its angular speed. Another piece of information that may be especially valuable is the temperature of the bearings upon which the wheel is rotating. In particular, in the case of towed vehicles, it is desirable to observe the temperature of the bearings as a means for early detection of a mechanical failure or impending mechanical failure.

Sensing all of these (or a plurality of these) parameters on a single wheel can become cumbersome due to the number of sensors required. There is therefore a need for a sensor that can measure multiple parameters of a rotating wheel. The present invention is directed toward meeting this need.

SUMMARY OF THE INVENTION

A system for detecting the angular velocity and temperature of a rotating member according to the present invention include a temperature sensor in proximity to a rotational mounting of the rotating member. The temperature sensor is adapted to produce a temperature signal corresponding to a temperature of a portion of the rotating member. The system further comprises a rotation-indicating element affixed to the rotating member, at least one rotation-detecting element adapted to detect rotational motion of said rotation-indicating element and a processing element in communication with said temperature sensor and said rotation-detecting element. The processing element is adapted to produce a signal corresponding to an angular velocity of the rotating member and a temperature observed by said temperature sensor.

One exemplary system according to the present invention comprises a temperature sensor adapted to produce a temperature signal and in proximity to a wheel bearing upon which the wheel is mounted. The system also comprises a magnet affixed to the wheel and adapted to produce a magnetic flux through a fixed area that regularly oscillates as the wheel rotates. The system further comprises at least two Hall effect sensors positioned to detect magnetic flux through said fixed area in quadrature. The system further comprises a processing element in communication with the temperature sensor and the at least two Hall effect sensors. The processing element is adapted to produce a signal corresponding to an angular velocity of the wheel and a temperature observed by said temperature sensor. The processing element comprises a logic element responsive to said at least two Hall effect sensors to produce a speed signal corresponding to an angular speed of said wheel and a direction signal corresponding to a direction of rotation of said wheel. The processing element also comprises a first sub-circuit, a second sub-circuit, and a switch responsive to the direction signal to cause said temperature signal to be sent on the first sub-circuit when the wheel has a first direction of rotation, and to cause the temperature signal to be sent on the second sub-circuit when the wheel has a second direction of rotation.

Other objects and advantages of a system according to the present invention will be apparent to those skilled in the art.

DETAILED DESCRIPTION OF THE PREFERRED EMBODIMENTS

Figure 1:
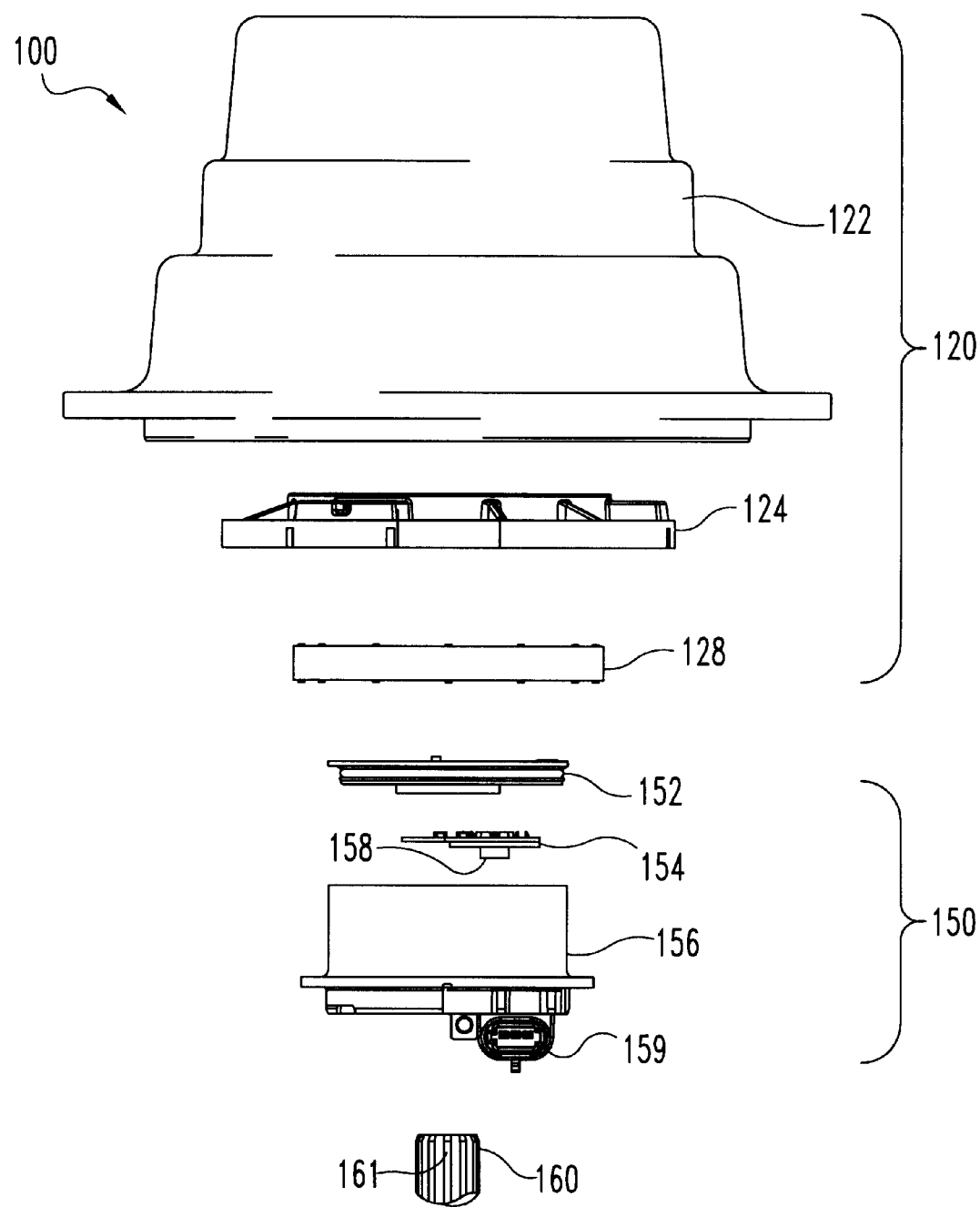
FIG. 1 is an exploded side elevation al view of certain elements of a preferred embodiment system according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, an such further applications of the principles of the invention as illustrated therein being contemplated as would normally occur to one skilled in the art to which the invention relates.

FIG. 1 illustrates certain elements of a preferred embodiment system for detecting wheel speed and bearing temperature, indicated generally at 100. The embodiment illustrated in FIG. 1 is adapted for use with a non-drive wheel, such as those used in the trailer portion of a tractor-trailer rig. The system 100 is affixed to an axle of a wheel, and comprises a hub unit 120 and a sensor unit 150. When the system 100 is properly affixed to the axle of the wheel, the hub unit 120 rotates in unison with the wheel, and the sensor unit 150 remains rotationally fixed with respect to the rest of the vehicle. The hub unit 120 and the sensor unit 150 thereby rotate with respect to each other at the same angular velocity at which the wheel is rotating with respect to the rest of the vehicle.

The hub unit 120 comprises a hub unit housing 122 affixed to the wheel. The hub unit 120 also comprises a ring magnet 12 that creates a magnetic field indicative of the position of the wheel. In the preferred embodiment, the ring magnet 128 is held in place inside the housing 122 by a nylon ring mount 124. The ring mount 124 can alternatively be made of any suitable non-magnetic material. In the preferred embodiment, the sensor unit 150 is formed to engage a round portion 160 of the axle having a series of teeth 161, such that the sensor unit 150 is rotationally fixed with respect to the axle. Alternatively, any means of coupling the sensor unit 150 to the axle may be used, so long as the sensor unit 150 is rotationally fixed relative to the axle. Because the non-drive wheels rotate on bearings with respect to the axle, the wheel and hub unit 120 are free to rotate with respect to the sensor unit 150. Thus, the hub unit 120 and sensor unit 150 rotate with respect to each other at the same angular velocity with which the wheel is rotating with respect to the rest of the vehicle.

Figure 2:
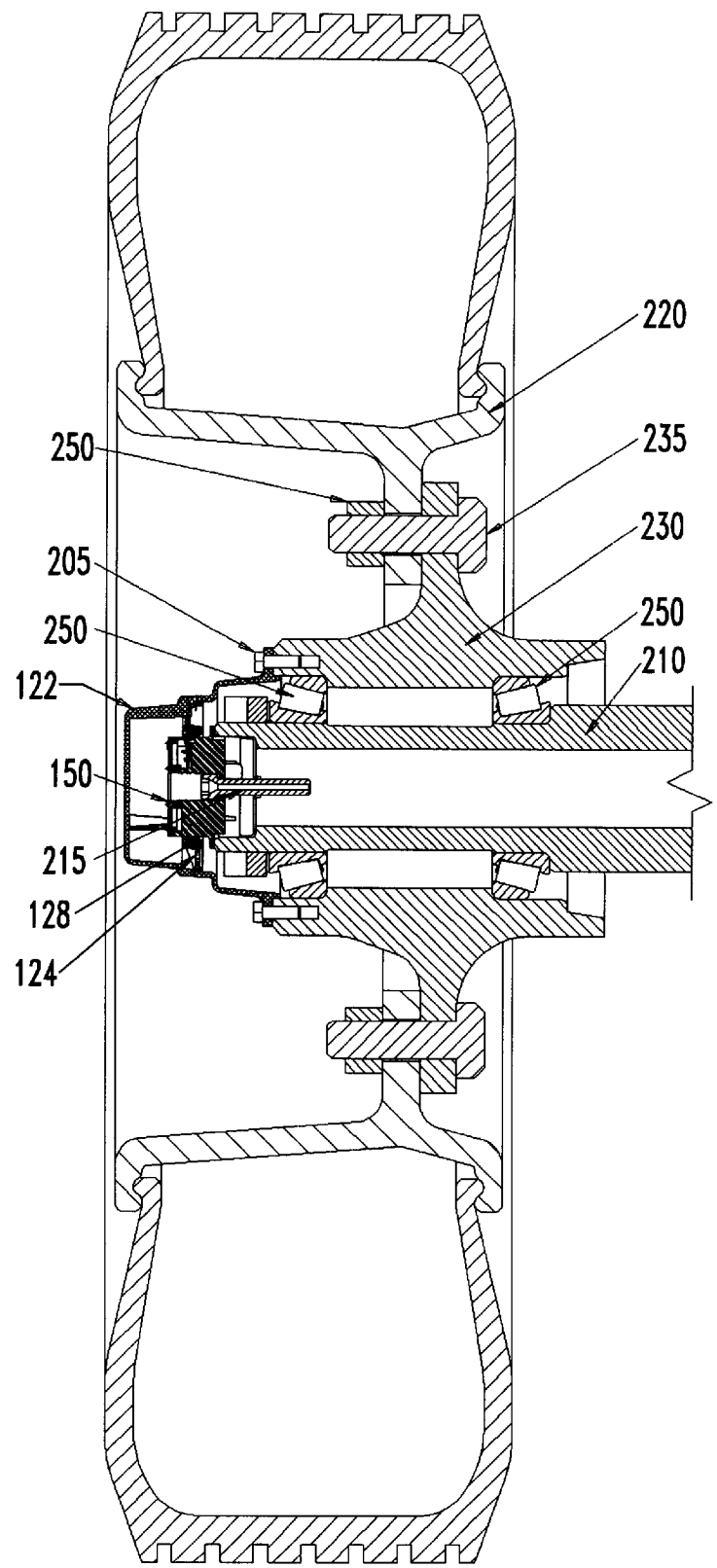
FIG. 2 is a cross-section of a wheel and bearing having the system according to the present invention mounted thereto.

Referring now to FIG. 2, a cross-section of the system 100 is shown in conjunction with the non-drive wheel 220, hub 230, and axle 210 to which it is affixed. In the preferred embodiment, the sensor unit 150 is bolted to the axle 210 with a sensor bolt 215 through a central hole along the sensor unit's 150 axis of rotation. In the preferred embodiment, the hub unit housing 122 is bolted to the hub 230 by a series of hubcap bolts 205. The hub 230 rotates on the axle 210 by means of bearings 250. The wheel 220 is affixed, in turn, to the hub 230 by wheel studs 235 and lug nuts 245.

Returning now to FIG. 1, in the preferred embodiment the sensor unit 150 comprises a sensor body 156 and a cap 152, which together enclose a circuit board 154. The circuit board 154 comprises a pair of Hall effect sensors 158 positioned to detect the rotating magnetic field created by the ring magnet 128 as the wheel rotates, and a temperature sensor 550 for detecting a temperature responsive to the bearing temperatures. The circuit board 154 further comprises elements operative to generate and transmit signals that indicate the speed and direction of rotation of the wheel and the temperature observed by the temperature sensor, as described in greater detail hereinbelow.

It will be appreciated by those skilled in the art that the system 100 can be adapted for use with other types of wheel mountings. For example, certain alternative embodiments can be used with drive wheels, which are typically fixedly mounted to an axle that rotates within an axle housing. In order to measure the wheel speed of such a drive wheel, the sensor unit 150 must be affixed to a portion of the vehicle other than the axle (or wheel) so that it is rotationally fix d with respect to the rest of the vehicle. The sensor unit 150 could be mounted to the axle housing, for example. For another example, the sensor unit 150 could be mounted to a portion of the body of the vehicle. As will be apparent to those skilled in the art, the sensor unit 150 can be mounted to any non-rotating portion of the vehicle so long as it is positioned so as to be able to detect the rotating magnetic field produced by the hub unit 120 and so as to be able to measure a temperature responsive to the bearing temperature.

Figure 3:
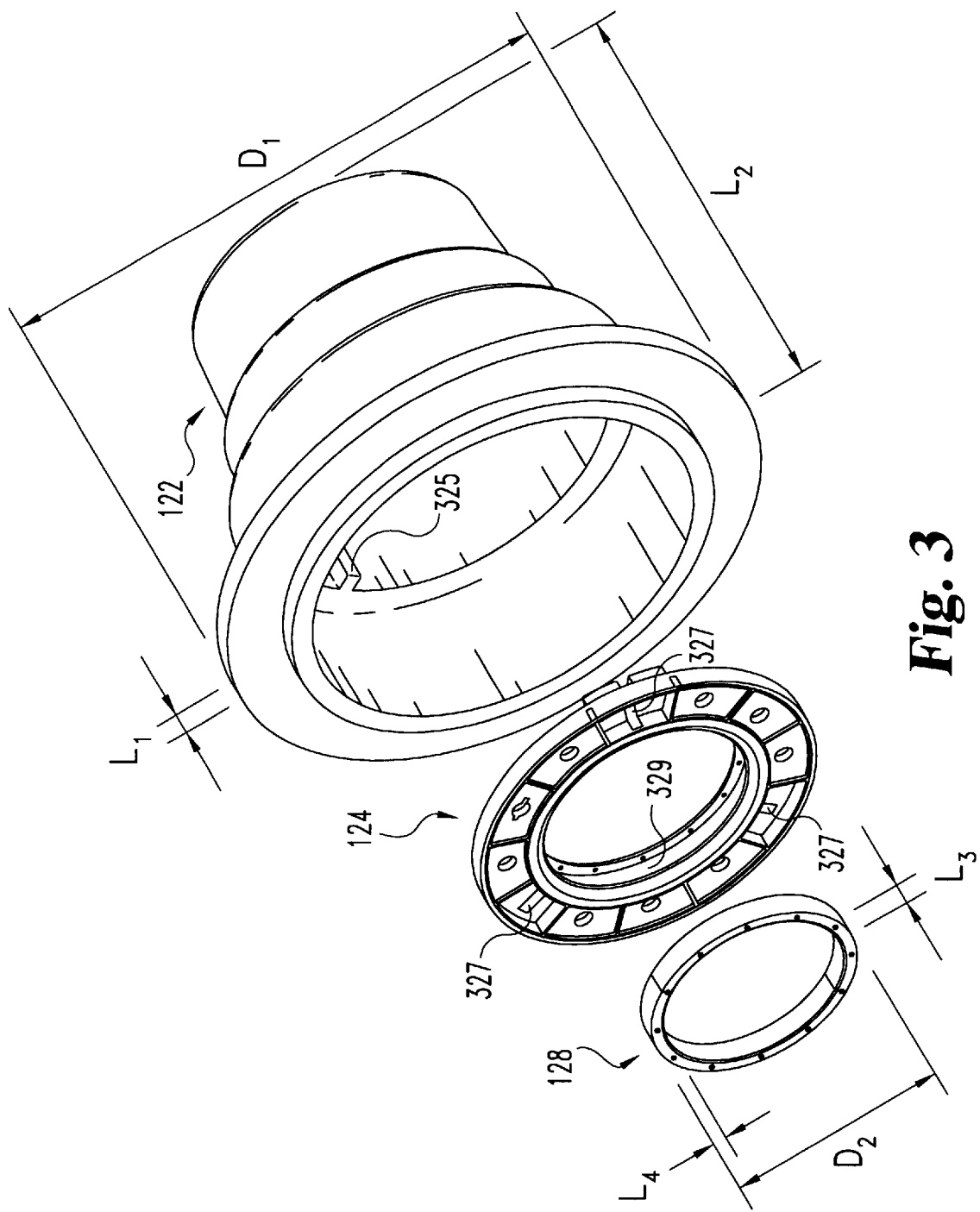
FIG. 3 is an exploded perspective view of certain elements of a hub unit portion of the system illustrated in FIG. 1.

FIG. 3 is an exploded perspective diagram illustrating further elements of a preferred embodiment hub unit 120. The hub unit 120 comprises a housing 122 having a diameter $D_1$ of approximately 6 inches, a depth $L_2$ of about 4.5 inches, and a wall thickness $L_1$ of about 0.125 inches. In the preferred embodiment, the housing 122 is made of aluminum. Alternatively, any suitably strong non-magnetic material may be used, including other metals, fiberglass, nylon, etc. The housing 122 has a series of raised ribs 325 that interlock with rectangular holes 327 in the ring mount 124 to secure the ring mount to the inside of the housing 122. The ring magnet 128 is affixed to the ring mount 124, and is thereby positioned inside the housing 122. In the preferred embodiment, the ring mount 124 has an internal groove 329 that contains and secures the ring magnet 128. Other means of mounting the ring magnet 128 as would occur to those skilled in the art may also be used, such as slide-on clips or a frictional fit between the ring magnet 128 and the ring mount 124. In the preferred embodiment the ring magnet 128 has a diameter $D_2$ of approximately 3 inches, a thickness $L_4$ of about 0.25 inches, and a height $L_3$ of about 0.375 inches.

Figure 4A:
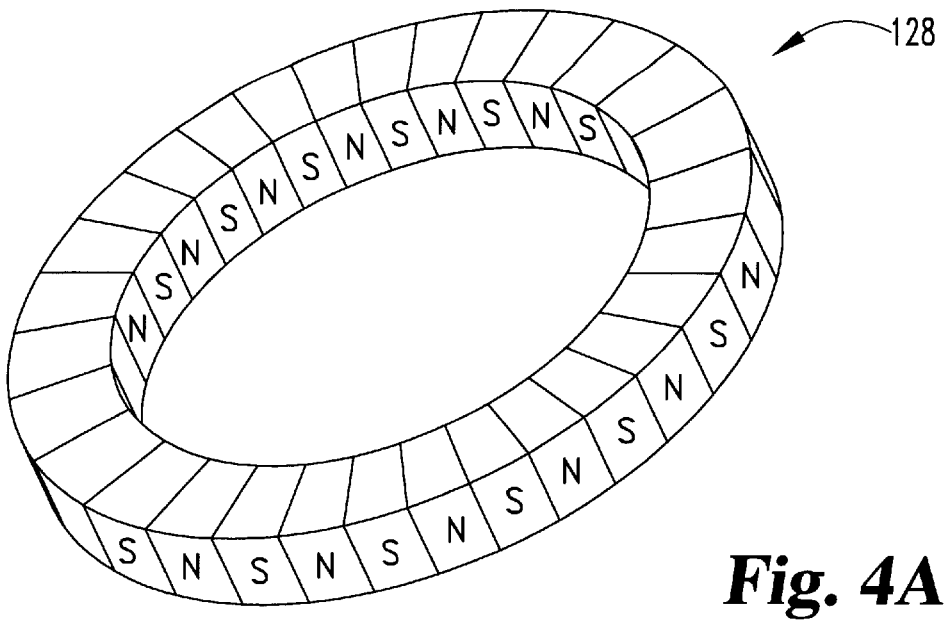
FIGS. 4a and 4b are diagrams illustrating geometries of the north and south poles in certain ring magnets suitable for use in the system illustrated in FIG. 1.
Figure 4B:
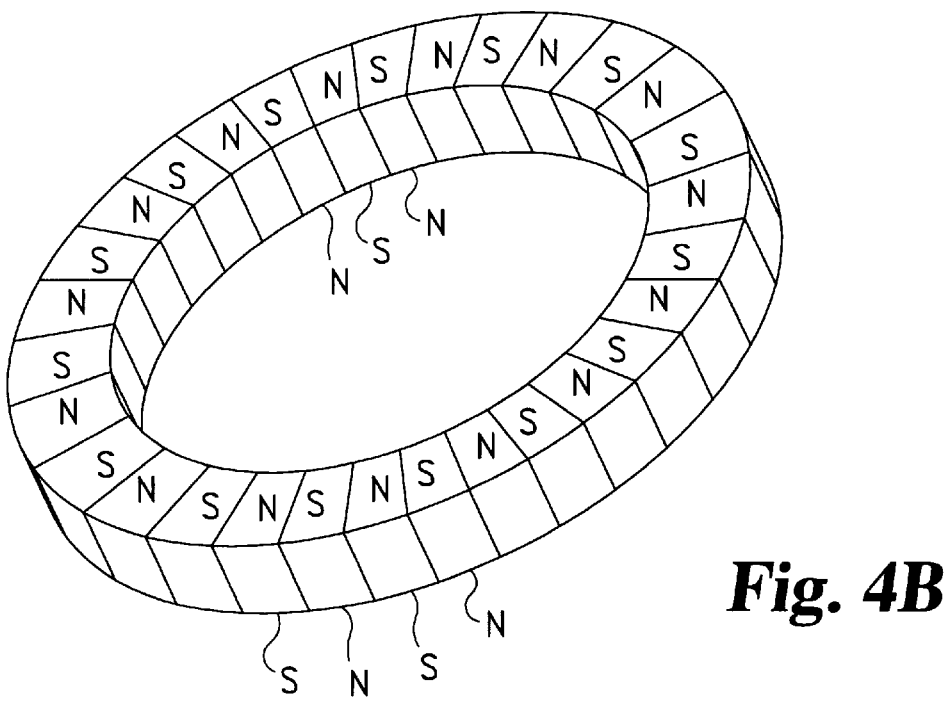

FIG. 4a illustrates the positioning of the alternating north and south poles in the preferred embodiment. In the preferred embodiment, the ring magnet 128 has about 50 alternating north and south poles pointing in the radial direction around the inside and outside surfaces of the ring magnet. Other arrangements of the north and south poles may be used, but it will be appreciated by those skilled in the art that the geometry of the sensor unit 150 must be adapted accordingly in order to position the Hall effect sensors 158 to intersect the alternating magnetic flux lines produced by the alternating north and south poles. For example, the north and south poles of the ring magnet 128 may be positioned as shown in FIG. 4b, but the sensor unit 150 would accordingly have to position the Hall effect sensors 158 outside of the ring magnet 128, adjacent to it, and facing along the axis of rotation.

Returning now to FIG. 1, the sensor unit 150 comprises a glass-filled nylon body 156 containing a printed circuit board 154. A cap 152 seals the body to protect the circuit board from dust, grease, or other environmental elements. The preferred embodiment employs nylon in the body 156 and cap 152 because it is non-magnetic and resistant to the effects of grease, oil, and temperature. It will be appreciated by those skilled in the art that other non-magnetic materials can used for the body 156 and cap 152, but that such alternative materials are preferably selected from those similarly resistant to the effects of temperature and exposure to grease and oil, in order for the sensor unit to be durable under the normal operating conditions. In the preferred embodiment, the interior of the portion of the body 156 that is not filled by the circuit board 154 is filled with glass fibers, as is known in the art, in order to provide additional structural integrity to resist the forces experienced during operation, including rapid acceleration during braking. In the preferred embodiment, the body 156 has a 3-pin male connector 159 on the side opposite the cap 152. The connector 159 is used to connect the sensor unit 150 with a transmission line to the vehicle's electronic control unit ("ECU").

A pair of Hall effect sensors 158 are mounted upon the circuit board 154. The Hall effect sensors are positioned to detect the alternating north and south poles of the ring magnet 128 in quadrature as the hub unit 120 rotates with respect to the sensor unit 150. In the preferred embodiment, the Hall effect sensors 158 are oriented in the sensor unit 150 so as to be parallel to the axis of rotation of the hub unit 120. The sensor unit 150 fits within the central hole in the ring magnet 128 when the system 100 is assembled, such that the alternating north and south poles, which face radially with respect to the axis of rotation of the hub unit 120, produce alternating magnetic flux lines that intersect the Hall effect sensors 158. It will be appreciated that the pair of Hall effect sensors 158 may be positioned to detect the series of north and south poles with any phase difference between them, other than 0 or 180 degrees, but that 90 degrees is the preferred phase difference. The sensor unit 150 also comprises a temperature sensor (shown as 550 in FIG. 5) that is positioned close enough to the wheel bearing to be responsive to it's temperature when the sensor unit 150 is affixed to the axle. Because the hub 230, axle 210, and bearings 250 are typically metal which is characterized by high thermal conductivity, the temperature sensor typically can be relatively distant from the bearings 250 and still be responsive to their temperature, as illustrated in FIG. 2. (Note that, as shown and discussed above with respect to FIG. 1, the temperature sensor 550 is on the circuit board 154, which is contained within the sensor housing 150.) The circuit board 154 further comprises a sensor circuit operative to generate and transmit electrical signals indicating the temperature and the angular velocity of the wheel via the 3-pin male connector 159, as discussed further hereinbelow.

Figure 5:
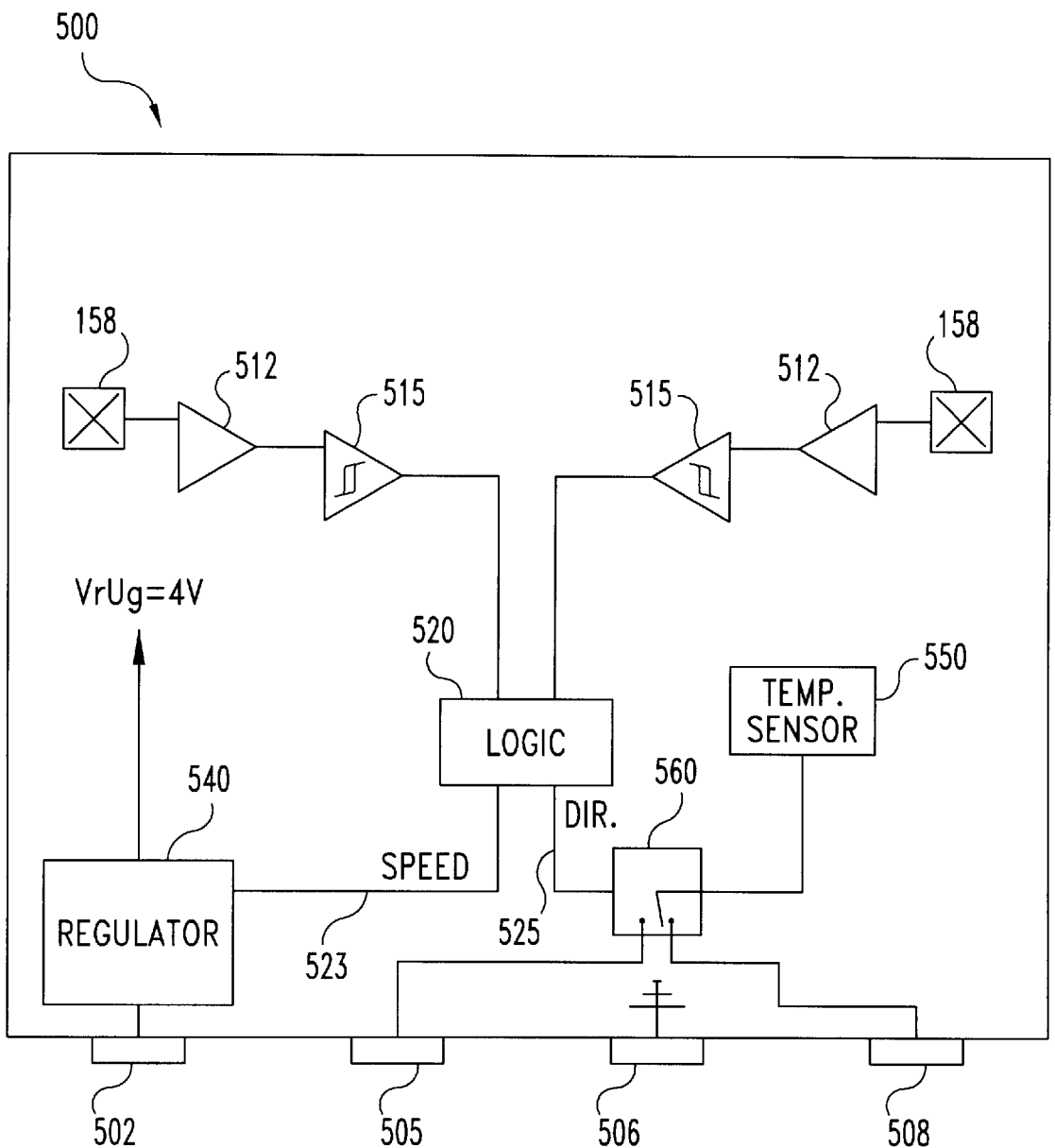
FIG. 5 is a block diagram of a sensor circuit suitable for use in the sensor unit portion of the system illustrated in FIG. 1.

FIG. 5 is a block diagram of certain elements of a preferred embodiment sensor circuit suitable for use in the sensor unit 150, indicated generally at 500. The sensor circuit 500 includes a voltage source pin 502 used to provide power for the sensor circuit and to carry a speed signal back to the ECU, two temperature/direction output pins 505 and 508 used to carry temperature and angular direction signals back to the ECU, and a ground 506. In the preferred embodiment the voltage supply pin 502 is connected to a power regulator 540 to produce a 4V regulated voltage source used by the elements of the circuit board 154 requiring a power input as it known in the art. The sensor circuit 500 also includes a temperature sensor 550 that is connected to a switch 560, which is in turn connected to the two temperature/direction output pins 505 and 508. The sensor circuit 500 further includes a pair of Hall effect sensors 158 connected to a pair of amplifiers 512, respectively, which are connected in turn to a pair of Schmitt triggers 515, respectively, which are connected, in turn, to a logic element 520. Outputs of the logic element 520 are connected to the voltage supply pin 502 via the voltage regulator 540, and to the switch 560.

In the preferred embodiment, the temperature sensor 550 generates a DC current that varies approximately linearly with the temperature variation over a range of temperatures to be detected. Those skilled in the art will appreciate that an AC current having an amplitude or frequency which varies in response to the observed temperature may also be used.

In the preferred embodiment, the Hall effect sensors 158 each have an output connected to an amplifier 512. The amplifiers 512 magnify the raw response of the Hall effect sensors 158 to the varying magnetic flux density generated by alternating north and south poles of the rotating ring magnet 128. The outputs of the amplifiers 512 are input to Schmitt triggers 515. In the preferred Embodiment, the Schmitt triggers 515 are operative to latch on in response to an output from the connected amplifier 512 corresponding to a magnetic flux density through the area defined by the connected Hall effect sensor 158 slightly less dense than but having the same sign as, that produced by a south pole of the ring magnet 128. Likewise, in the preferred embodiment, the Schmitt triggers 515 are operative to latch off in response to an output from the connected amplifier 512 corresponding to a magnet flux density of the same sign but slightly less dense than that produced by a north pole of the ring magnet 128 through the area defined by the position of the connected Hall effect sensor 158. In this way, each set of a Hall effect sensor 158, amplifier 512, and Schmitt trigger 515 produces a square wave with a frequency matching the frequency of the alternation between positive and negative magnetic flux densities at the positions of the Hall effect sensors 158 produced by the rotation of the wheel. The outputs of the Schmitt triggers 515 are input to the logic element 520.

It will be appreciated that Schmitt triggers 515 may equally well be used which latch on in response to a north pole and latch off in response to a south pole. Those skilled in the art will recognize that such Schmitt triggers 515 will produce a similar square wave with the same frequency and that is 180 degrees out of phase with those produced by the preferred embodiment Schmitt triggers. Those skilled in the art will also appreciate that, because the sensor circuit 500 responds to the relatively extreme changes in magnetic flux density produced by alternating north and south poles, the hysteresis of the Schmitt triggers may be relatively high, and the strength of the polarization of the ring magnet 128 may be relatively low. Since the strength of polarization of a permanent magnet is typically sufficient to assure consistent response of the sensor circuit 500, in the preferred embodiment the ring magnet 128 is a permanent magnet, rather than an electromagnet.

Integrated circuits ("IC") that include Hall effect sensors 158, amplifiers 512, and Schmitt triggers 515 that are suitable for use in a sensor circuit 500 are commercially available, and include the H90224 produced by Melexis, N. V., located at Rozendaalstraat 12, B-8900 Ieper, Belgium (available through Melexis, Inc., 41 Locke Road—Concord, NH 03301 USA), and the PJ1301 produced by Promax-Johnton, located at No.45, Wu-Shiun Street, Da-Wu-Luen industrial District, Keelung, Taiwan, R.O.C. These dual Hall effect latch ICs will produce the appropriate square waves in response to alternating magnetic flux lines to provide the logic element 520 in order to resolve the angular speed and direction of rotation of the ring magnet 128.

Because the Hall effect sensors 158 are positioned to detect the alternating north and south poles in quadrature, the square waves produced by the Schmitt triggers 515 have the same frequency, but are out of phase. The logic element uses the frequency of the square wave outputs of the Schmitt triggers 515 to determine an angular speed of the wheel and generates a corresponding speed output 523, as is known in the art. The logic element similarly determines a direction of angular rotation of the wheel from the phase difference between the two Schmitt trigger 515 outputs and generates a corresponding direction output 525, as is known in the art. Those skilled in the art will appreciate that the logic element 520 may be adapted to interpret the square wave inputs from the Schmitt triggers 515 in order to make these determinations based on the strength and geometry of the ring magnet 128 and the position of the Hall effect sensors 158. For example, depending on the spacing of the Hall effect sensors 158 (and the spacing of the north and south poles of the ring magnet 128), the phase shift may vary; so long as the phase difference is not 0 or 180 degrees, the direction of rotation can be determined by an appropriate logic element.

The speed output 523 is used to control the draw of current from the voltage supply pin 502 such that the current varies linearly with the angular speed of the wheel. One means of controlling the current drawn is using a tuning current source, preferably in combination with a fixed current source, as is known in the art. Other means apparent to those skilled in the art may also be used. The angular direction output 525 from the logic element 520 is used to toggle the switch 560 that causes the temperature signal to be carried on one or the other of the temperature/direction pins 505 and 508, such that, when the wheel is rotating clockwise, the temperature signal is applied to the temperature/direction pin 508 and no signal is applied to temperature/direction pin 505, and when the wheel is rotating counter-clockwise, the temperature signal is applied to temperature/direction pin 505, and no signal is applied to temperature/direction pin 508.

Although it will be appreciated by those skilled in the art that a large number of suitable sensor circuits could be used in the sensor unit 150, one such sensor circuit is the MLX90246, manufactured by Melexis (located and contactable at the addresses listed above).

Thus, the sensor circuit 500 indicates the angular speed of the wheel by the current drawn by the voltage supply pin 502. The sensor circuit 500 indicates the angular direction of the wheel by applying the temperature signal to the counter-clockwise temperature/direction pin 505 when the wheel is rotating counter-clockwise, and by applying a signal to the clockwise temperature/direction pin 508 when the wheel is rotating clockwise. The temperature is indicated by the magnitude of the temperature signal, regardless of which temperature/direction pin presently is carrying the temperature signal. In the preferred embodiment, the voltage supply pin 502 and the temperature/direction pins 505 and 508 are connected to the three pins of the 3-pin male connector 159, respectively. Because the sensor unit 150 does not rotate with respect to the rest of the vehicle, the 3-pin male connector can be directly engaged by a hardwired transmission line to carry the output information directly to the ECU.

The system 100 is preferably installed on each of the wheels of a vehicle, so that angular velocity and bearing temperature information is provided to the ECU for each wheel. The independent angular velocity information for each wheel can be used in a variety of applications, including anti-lock brake systems, traction control systems, or other active suspension and drive systems. The information on the direction of rotation is useful, for example, for the activation of reverse warning lights or alarms. Other advantages of a real-time indication of wheel rotation direction and independent wheel speed will be apparent to those skilled in the art. Likewise, the independent measurement of bearing temperatures is helpful in diagnosing mechanical problems in a bearing that may precede a mechanical failure. Although ambient temperatures may vary they will typically be common to each of the wheel bearings on a single vehicle. Therefore, differences in the temperatures of the wheel bearings will typically result from differences in the heat released due to friction in the bearing. Because bearings are designed to function with little friction, the presence of additional friction is both symptomatic of improper functioning and an important contributing factor to wear and ultimately to mechanical failure. Thus, by providing independent measurement of the temperature of each wheel bearing, a means for diagnosing mechanical problems early is provided.

While the preferred embodiment system 100 is preferably installed on the wheels of a vehicle, it will be appreciated that a system according to the present invention can be adapted for other applications involving one or more rotating members, as would occur to a person of ordinary skill in the art. For example, a system 100 could be used to monitor the speed and temperature of an electric motor.

While the invention has been illustrated and described in detail in the drawings and foregoing description, the same is to be considered as illustrative and not restrictive in character, it being understood that only the preferred embodiment, and certain alternative embodiments deemed helpful in further illuminating the preferred embodiment, have been shown and described and that all changes and modifications that come within the spirit of the invention are desired to be protected.

What is claimed is:

1. A system for detecting the angular speed of a wheel affixed to an axle by a bearing, the system comprising:
   a hub unit mounted to the axle of the wheel and rotationally coupled to the wheel, the hub unit comprising a ring magnet positioned substantially in a plane of rotation of the wheel, the ring magnet having a plurality of north and south poles facing radially with respect to an axis of rotation of the wheel;
   a sensor unit positioned inside said hub unit and rotationally coupled to said axle and operative:
      to detect a temperature related to a temperature of the bearing;
      to detect said plurality of north and south poles as the wheel rotates;
      to produce a signal corresponding to an angular speed of the wheel; and
      to produce a signal corresponding to said temperature;
   a first temperature sub-circuit connected to the sensor unit;
   a second temperature sub-circuit connected to the sensor unit;
   wherein said signal corresponding to said temperature is carried on said first temperature sub-circuit if the wheel is rotating in a first direction, and said signal corresponding to said temperature is carried on said second temperature sub-circuit if the wheel is rotating in a second direction.

2. The system of claim 1, wherein said speed signal is carried on a supply voltage sub-circuit, and wherein said speed signal indicates said angular speed by drawing current from a voltage supply as a function of said angular speed.

3. The system of claim 1, wherein said signal corresponding to said temperature is approximately linearly responsive to a temperature of said bearing.

4. A system for detecting the angular speed of a wheel mounted to an axle by a bearing and for detecting a temperature related to the temperature of the bearing, the system comprising:
   a hub unit approximately 6 inches in diameter, 4.5 inches deep, and having a wall thickness of about 0.125 inches, the hub unit being mounted to the axle and rotationally coupled to the wheel, the hub unit comprising a ring magnet positioned substantially in a plane of rotation of the wheel, the ring magnet having approximately 50 alternating north and south poles facing radially inward; and
   a sensor unit positioned inside said sub unit and that rotates as a unit with the axle, the sensor comprising:
      at least two Hall effect sensors positioned to detect said alternating north and south poles in quadrature as the wheel rotates;
      a temperature sensing element positioned close enough to the bearing to be responsive to a temperature of the bearing;
      a first sub-circuit;
      a second sub-circuit; and
      wherein said sensor unit is operative to produce a temperature signal substantially linearly responsive to a temperature of said bearing and to place said temperature signal on said first sub-circuit if the wheel is rotating in a first direction and to place said temperature signal on said second sub-circuit if the wheel is rotating in a second direction, and said sensor unit is operative to indicate an angular speed of the wheel by drawing current from a voltage source as a function of said angular speed.

5. A system for detecting the angular velocity and temperature of a rotating member, the system comprising:

a temperature sensor in proximity to a rotational mounting of the rotating member and adapted to produce a temperature signal corresponding to a temperature of a portion of the rotating member;

a rotation-indicating element affixed to the rotating member;

at least one rotation-detecting element adapted to detect both an angular speed and a direction of rotation of said rotation-indicating element; and a processing element in communication with said temperature sensor and said rotation-detecting element, said processing element comprising a logic element responsive to said at least one rotation-detecting element to produce a speed signal corresponding to an angular speed of said rotating member and a direction signal corresponding to a direction of rotation of said rotating member;

a first sub-circuit and a second sub-circuit;

a switch having said direction signal as an input, and responsive to said direction signal to switch said temperature signal between said first sub-circuit and said second sub-circuit, such that said temperature signal is carried on said first sub-circuit when th wheel is rotating in a first direction, and on said second sub-circuit when the wheel is rotating in a second direction.

* * * * *